United States Patent
Enta et al.

(10) Patent No.: US 11,207,768 B2
(45) Date of Patent: Dec. 28, 2021

(54) FASTENER DRIVING MACHINE

(71) Applicant: KOKI HOLDINGS CO., LTD., Tokyo (JP)

(72) Inventors: Jun Enta, Ibaraki (JP); Seiichi Kodato, Ibaraki (JP); Takashi Ueda, Ibaraki (JP); Toshinori Yasutomi, Ibaraki (JP)

(73) Assignee: KOKI HOLDINGS CO., LTD., Tokyo (JP)

(*) Notice: Subject to any disclaimer, the term of this patent is extended or adjusted under 35 U.S.C. 154(b) by 243 days.

(21) Appl. No.: 16/488,156

(22) PCT Filed: Feb. 23, 2018

(86) PCT No.: PCT/JP2018/006760
§ 371 (c)(1),
(2) Date: Aug. 22, 2019

(87) PCT Pub. No.: WO2018/180082
PCT Pub. Date: Oct. 4, 2018

(65) Prior Publication Data
US 2021/0138622 A1    May 13, 2021

(30) Foreign Application Priority Data
Mar. 29, 2017    (JP) .............................. JP2017-064712

(51) Int. Cl.
*B25C 1/04* (2006.01)
*B23Q 11/10* (2006.01)
*B25C 1/06* (2006.01)

(52) U.S. Cl.
CPC .......... *B25C 1/047* (2013.01); *B23Q 11/1092* (2013.01); *B25C 1/06* (2013.01)

(58) Field of Classification Search
CPC ..... B25C 1/06; B25C 1/04; B25C 1/041–046; B25C 5/047; B25C 5/13; B25C 5/15; B23Q 11/1092
See application file for complete search history.

(56) References Cited

U.S. PATENT DOCUMENTS

| 2,575,455 | A | 11/1951 | Lang |
| 3,572,211 | A | 3/1971 | Doyle |

(Continued)

FOREIGN PATENT DOCUMENTS

| JP | 2003-136423 A | 5/2003 |
| JP | 2009-160665 A | 7/2009 |

(Continued)

OTHER PUBLICATIONS

Japanese Notice of Reasons for Refusal issued in corresponding Japanese Patent Application No. 2019-508798, dated May 26, 2020, with English translation.

(Continued)

*Primary Examiner* — Anna K Kinsaul
*Assistant Examiner* — Veronica Martin
(74) *Attorney, Agent, or Firm* — McDermott Will & Emery LLP

(57) ABSTRACT

A fastener driving machine provided with a mechanism to lubricate pins or racks is realized. A fastener driving machine includes a driver blade, pins, and a lubricant feeding mechanism. The driver blade can reciprocate in a first direction and a second direction opposite to each other, and hits a fastener when the driver blade moves in the first direction. The pins respectively engage with racks provided on the driver blade to move the driver blade in the second direction. The lubricant feeding mechanism supplies lubricant to the racks and the pins.

10 Claims, 7 Drawing Sheets

1 : FASTENER DRIVING MACHINE
30 : DRIVER BLADE
31 : RACK
44 : PIN
50 : LUBRICANT SUPPLY MECHANISM

(56) References Cited

U.S. PATENT DOCUMENTS

| | | | |
|---|---|---|---|
| 2003/0080171 A1 | 5/2003 | Sato et al. | |
| 2009/0032565 A1 | 2/2009 | McGuinness et al. | |
| 2009/0090759 A1* | 4/2009 | Leimbach | B25C 1/047 |
| | | | 227/10 |
| 2017/0190037 A1 | 7/2017 | Sato et al. | |
| 2017/0326715 A1* | 11/2017 | Chen | B25C 5/13 |
| 2018/0154505 A1* | 6/2018 | Sato | B25C 1/06 |

FOREIGN PATENT DOCUMENTS

| | | |
|---|---|---|
| JP | 2012-236251 A | 12/2012 |
| JP | 2016-209941 A | 12/2016 |
| WO | 2015/182508 A1 | 12/2015 |
| WO | 2016/101117 A1 | 6/2016 |

OTHER PUBLICATIONS

International Search Report issued in corresponding International Patent Application No. PCT/JP2018/006760, dated May 29, 2018, with English translation.

Extended European Search Report issued in corresponding European Patent Application No. 18776476.6-1017, dated Sep. 25, 2020.

\* cited by examiner

1 : FASTENER DRIVING MACHINE
30 : DRIVER BLADE
31 : RACK
44 : PIN
50 : LUBRICANT SUPPLY MECHANISM

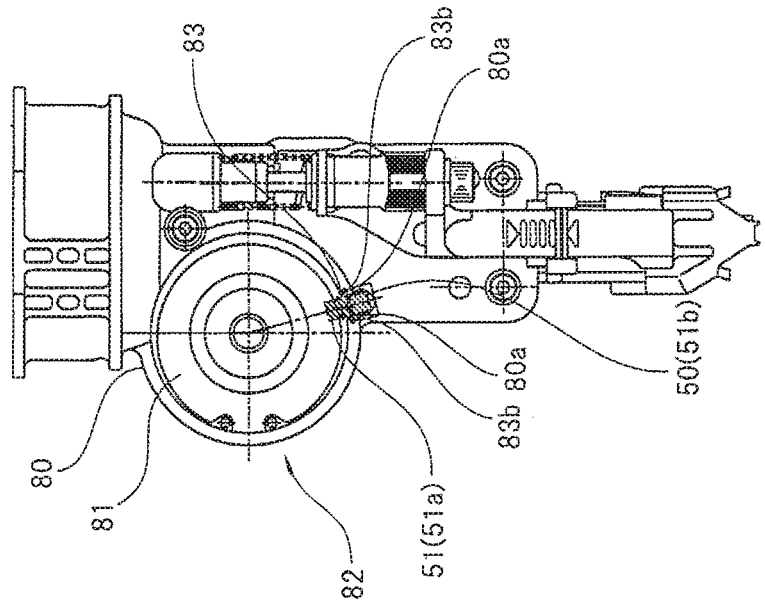
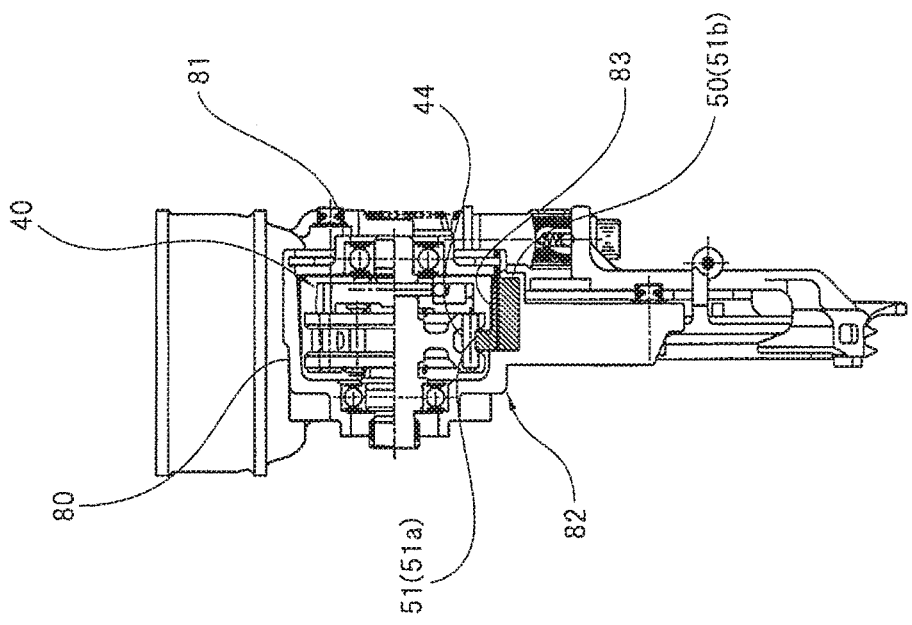
FIG. 7A
FIG. 7B

FASTENER DRIVING MACHINE

CROSS REFERENCE

This application is the U.S. National Phase under 35 U.S.C. § 371 of International Application No. PCT/JP2018/006760, filed on Feb. 23, 2018, which claims the benefits of Japanese Application No. 2017-064712, filed on Mar. 29, 2017, the entire contents of which are hereby incorporated by reference.

TECHNICAL FIELD

The present invention relates to a fastener driving machine that drives a fastener such as a pin into a driven material such as wood or a gypsum board.

BACKGROUND ART

A fastener driving machine includes a piston housed in a cylinder so as to reciprocate, and a driver blade integrally formed with the piston. The piston reciprocates in the cylinder between a top dead center and a bottom dead center. The driver blade reciprocates with reciprocation of the piston. The fastener driving machine further includes a feeding mechanism configured to feed fasteners onto a moving route of the driver blade (or an injection passage). The feeding mechanism is configured to feed a fastener onto the injection passage when the driver blade is moved upward to a predetermined position with movement of the piston from a side of the bottom dead center to a side of the top dead center. Then, when the driver blade is lowered with movement of the piston from the top dead center side to the bottom dead center side, a fastener that stands ready in the injection passage is hit by the driver blade. The hit fastener comes out from an injection port that is an outlet of the injection passage, and is driven onto wood or a gypsum board.

As means for reciprocating the piston as described above, there is a fastener driving machine that utilizes air pressure (or a gas spring). A piston in this type of fastener driving machine is driven by an electric motor to move from a side of a bottom dead center to a side of a top dead center, while the piston moves from the top dead center side to the bottom dead center side by the air pressure. For example, a plurality of racks is provided on a side surface of a driver blade along an axial direction thereof. Further, a wheel rotatively driven by the electric motor is provided in the vicinity of the driver blade. A plurality of pins is provided in the wheel along a circumferential direction thereof. When the wheel is rotated, the pins provided in the wheel in turn engage with the racks provided on the driver blade, respectively. More specifically, a first pin, a second pin, and a plurality of third pins are provided in the wheel. The second pin is most separated from the first pin in a rotational direction of the wheel. The plurality of third pins is arranged between these first and second pins. When the wheel is rotated, the first pin first engages with a rack of the driver blade. Then, the third pin adjacent to the first pin in the rotational direction engages with a next rack, and another third pin adjacent to this third pin engages with a next rack after the next rack. Hereinafter, the remaining third pins respectively engage with the remaining racks in turn, whereby the driver blade is lifted up. As a result, the piston provided integrally with the driver blade is moved (or moved upward) in a cylinder from the bottom dead center side to the top dead center side.

Then, when the piston reaches the top dead center, the engagement of the second pin with the rack is released. Namely, the second pin is a pin that finally engages with the corresponding rack during one cycle. When the engagement of the second pin with the rack is released, the piston is moved from the top dead center side toward the bottom dead center side by pressure of air in the cylinder, which is compressed with rise in the piston. The driver blade is lowered with such movement of the piston, whereby a fastener is hit by the driver blade.

RELATED ART DOCUMENTS

Patent Documents

Patent Document 1: Japanese Patent Application Publication No. 2016-209941

SUMMARY OF THE INVENTION

Problems to be Solved by the Invention

In the conventional fastener driving machine, a mechanism or means for lubricating the pins and the racks that respectively engage with each other has not been provided. For this reason, the pins and the racks become worn while the engagement and the release of the engagement are repeated. In a case where a worker frequently lubricates each engaging portion between the pin and the rack, abrasion thereof could be reduced. However, this maintenance was complicated, and there was room for improvement.

It is an object of the present invention to realize a fastener driving machine with excellent maintainability and excellent product lifetime by allowing lubricant for lubricating pins and racks to be held over a long period of time.

Means for Solving the Problems

A fastener driving machine according to the present invention is a fastener driving machine configured to drive a fastener into a driven material, the fastener driving machine including: a hitting member configured to reciprocate in a first direction and a second direction opposite to each other, the hitting member being configured to hit a fastener when the hitting member moves in the first direction; an engaging member that engages with the hitting member to move the hitting member in the second direction; and a lubricant feeding mechanism configured to feed lubricant to the hitting member and the engaging member.

Advantageous Effects of the Invention

According to the present invention, it is possible to realize a fastener driving machine with excellent maintainability and excellent product lifetime in which pins and racks are lubricated over a long period of time.

BRIEF DESCRIPTIONS OF THE DRAWINGS

FIGS. 6A and 6B are respectively a side view of a felt and a front view of the felt; and.

FIGS. 7A and 7B are a partially enlarged view illustrating one modification example of the fastener driving machine according to the second embodiment.

DESCRIPTIONS OF THE EMBODIMENTS

First Embodiment

Figure 1:
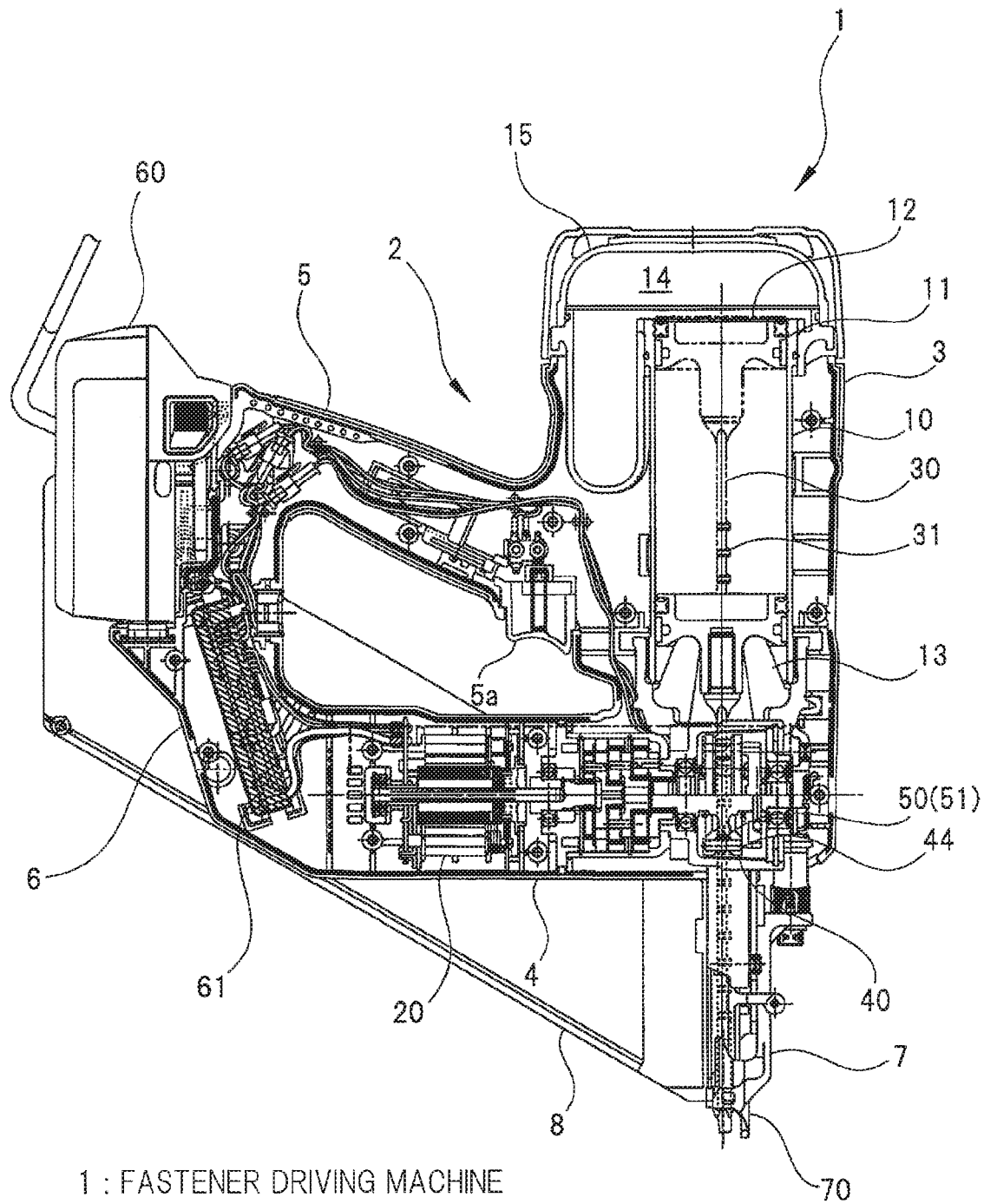
FIG. 1 is a cross-sectional view illustrating the whole configuration of a fastener driving machine according to a first embodiment.

Hereinafter, one example of a fastener driving machine to which the present invention is applied will be described in detail with reference to the drawings. Note that in each of the drawings referred in the following explanation, the same reference numeral is assigned to the same configuration or substantially the same configuration.

A fastener driving machine 1 illustrated in FIG. 1 includes a housing 2. The housing 2 includes a cylinder case 3, a motor case 4, and a handle 5. A cylinder 10 is housed in the cylinder case 3, and an electric motor 20 is housed in the motor case 4. The motor case 4 and the handle 5 extend from the cylinder case 3 in substantially the same direction. An end of the motor case 4 and an end of the handle 5 are coupled to each other by a coupling portion 6. The housing 2 includes two housing half bodies each formed by synthetic resin such as nylon or polycarbonate. The housing 2 is assembled by causing these two housing half bodies to come face to face with each other.

A piston 11 is housed within the cylinder 10 so as to be able to reciprocate. The piston 11 reciprocates between atop dead center and a bottom dead center along an axial direction of the cylinder 10 inside the cylinder 10. In other words, the piston 11 moves from a side of the top dead center to a side of the bottom dead center in the cylinder 10, and moves from the bottom dead center side to the top dead center side. A piston chamber 12 is partitioned in the cylinder 10 by an inner circumferential surface of the cylinder 10 and an upper surface of the piston 11. Volume of the piston chamber 12 increases or decreases with reciprocation of the piston 11.

On the other hand, a driver blade 30 as a hitting member is coupled to a lower surface of the piston 11. The driver blade 30 is formed integrally with the piston 11, and reciprocates together with the piston 11. Specifically, a nose part 7 is provided at a tip of the cylinder case 3. An injection passage is provided inside the nose part 7. The driver blade 30 reciprocates in the injection passage with reciprocation of the piston 11. In the following explanation, a reciprocating direction of the piston 11 and the driver blade 30 in FIG. 1 is defined as a vertical direction. Namely, a vertical direction of the paper of FIG. 1 is defined as a vertical direction. Further, in the present embodiment, a downward direction corresponds to a first direction defined in claim 1, and an upward direction corresponds to a second direction therein.

A magazine 8 in which many fasteners are housed is attached to the housing 2. The fasteners housed in the magazine 8 are fed one by one to the injection passage by a feeding mechanism included in the magazine 8. The driver blade 30 is configured to hit a head of each of the fasteners that are fed in turn to the injection passage. The fastener whose head is hit passes through the injection passage, and is caused to come out from an injection port that is an outlet of the injection passage, whereby the fastener is driven into a driven material such as wood or a gypsum board.

Here, the piston 11 illustrated in FIG. 1 is positioned at the top dead center, and a tip of the driver blade 30 is positioned at an upper limit position. In other words, the upper limit position means a position of the tip of the driver blade 30 when the piston 11 is positioned at the top dead center. When the piston 11 illustrated in FIG. 1 is moved to the bottom dead center, this also causes the driver blade 30 to be lowered, and the tip of the driver blade 30 is moved to a lower limit position. In other words, the lower limit position means a position of the tip of the driver blade 30 when the piston 11 is positioned at the bottom dead center. Note that in the following explanation, the tip of the driver blade 30 may be called as a "blade tip". Further, a position of the blade tip may also be called as a "blade tip position".

A damper 13 made of rubber or urethane is provided at a bottom portion of the cylinder 10. The damper 13 receives the piston 11 that reaches the bottom dead center, whereby a collision between the piston 11 and the cylinder 10 is avoided. The driver blade 30 extending from the piston 11 toward a lower side passes through the damper 13 to protrude from the cylinder 10 via a through hole provided at the bottom portion of the cylinder 10.

Figure 2:
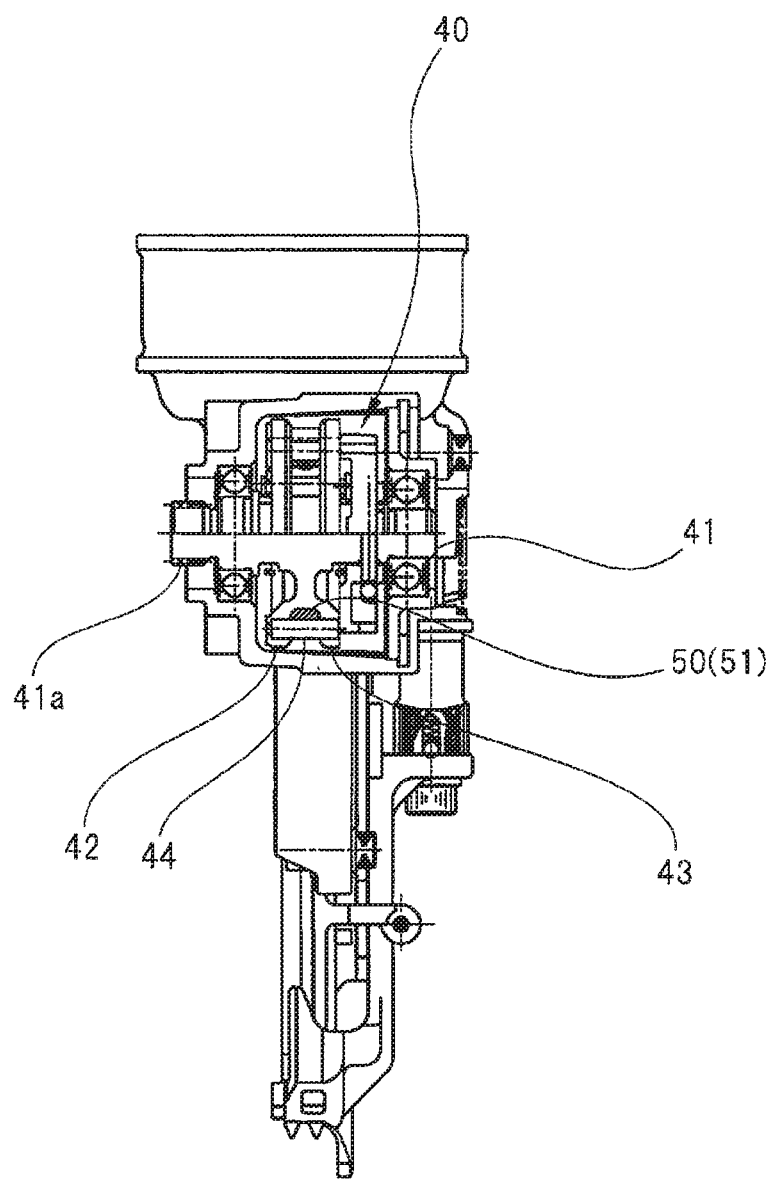
FIG. 2 is a partially enlarged view of the fastener driving machine according to the first embodiment.

As illustrated in FIG. 2, a wheel 40 is provided in the vicinity of the driver blade 30 (see FIG. 1). The wheel 40 includes a rotational shaft 41 formed integrally with the wheel 40, a first flange part 42, and a second flange part 43. The first flange part 42 and the second flange part 43 are provided in the middle of the rotational shaft 41 in an axial direction thereof, and face with each other. In other words, the rotational shaft 41 passes through the first flange part 42 and the second flange part 43. One end of the rotational shaft 41 protrudes from the first flange part 42, and the other end of the rotational shaft 41 protrudes from the second flange part 43. Each protruded portion of the rotational shaft 41 is supported by a bearing, whereby the wheel 40 can be rotated as a whole. Moreover, a gear 41a is formed at one protruded portion of the rotational shaft 41, which protrudes from the first flange part 42. The wheel 40 is driven to rotate by a driving force inputted via this gear 41a.

Figure 3:
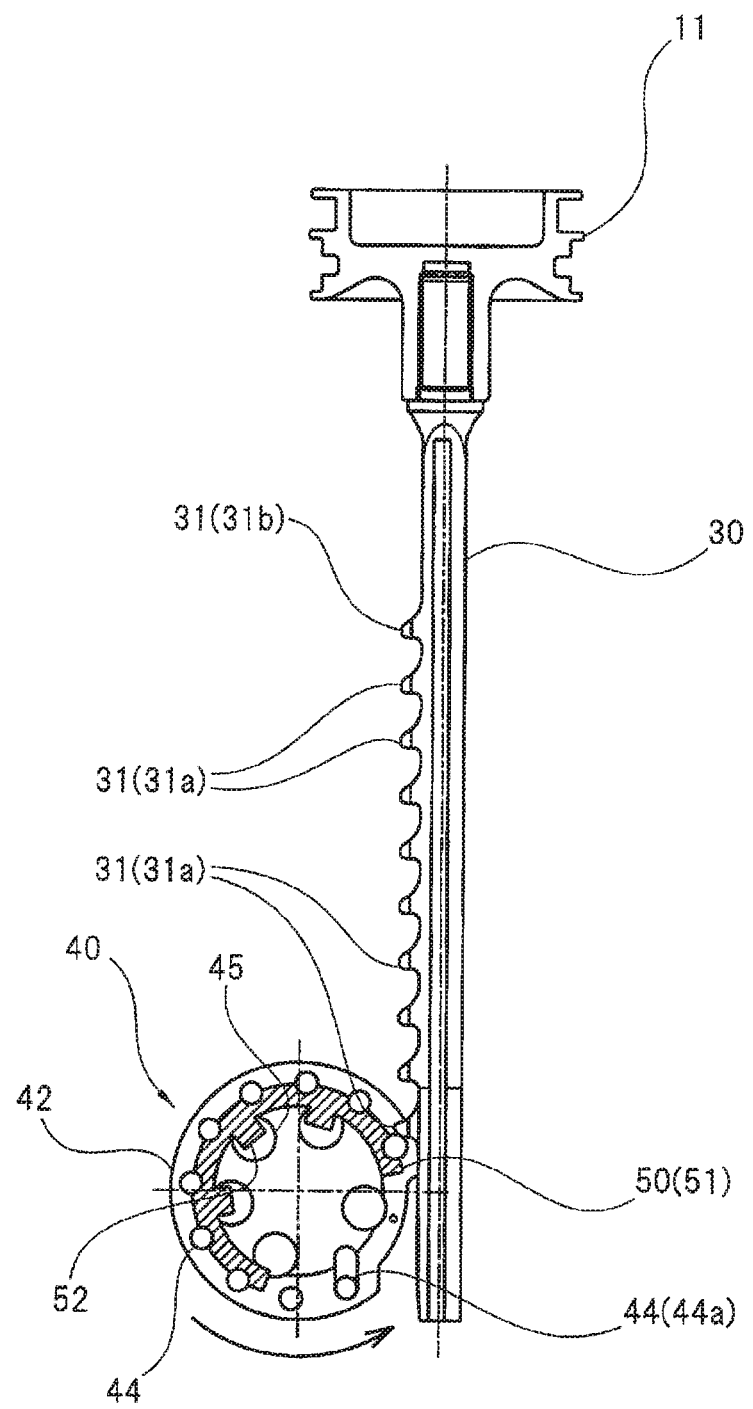
FIG. 3 is another partially enlarged view of the fastener driving machine according to the first embodiment.

As illustrated in FIG. 2 and FIG. 3, a plurality of pins 44 as engaging members is provided in the wheel 40. In the present embodiment, ten pins 44 are provided, and these pins 44 are arranged at intervals along a circumferential direction of the wheel 40. Each of the pins 44 extends in a facing direction between the first flange part 42 and the second flange part 43. One end of each of the pins 44 is rotatably held by the first flange part 42, and the other end thereof is rotatably held by the second flange part 43. On the other hand, a plurality of racks 31 (ten in this case) is provided on the driver blade 30 as the hitting member along an axial direction thereof.

A lubricant feeding mechanism 50 configured to feed lubricant to the driver blade 30 as the hitting member and the pins 44 as engaging members is provided in the wheel 40. More strictly speaking, the lubricant feeding mechanism 50 feeds lubricant (or grease) to the racks 31 provided on the driver blade 30 and the pins 44 provided in the wheel 40.

The lubricant feeding mechanism 50 includes a felt 51 as a lubricant impregnated body in which the lubricant is impregnated. The felt 51 is disposed at a position at which the felt 51 is at least allowed to come into contact with the pins 44. The felt 51 in the present embodiment is provided in the wheel 40 so as to be rotated integrally with the wheel 40. Specifically, the felt 51 has a roughly C-shaped side shape, and is disposed between the first flange part 42 and the second flange part 43 and inside the pins 44 so as to surround the rotational shaft 41. In other words, the felt 51 is disposed inside the pins 44 in a radial direction of the wheel 40, and an outer peripheral surface of each of the pins 44 is in contact with the felt 51. Therefore, lubricant impregnated in the felt 51 is directly fed to the outer peripheral surface of each of the pins 44, and the lubricant is also fed to an outer peripheral surface of each of the racks 31 via the pins 44, whereby both the pins 44 and the racks 31 are lubricated.

A plurality of projected portions 52 is formed on the felt 51. Each of the plurality of projected portions 52 protrudes toward the inside of the wheel 40 in the radial direction thereof. These projected portions 52 respectively engage with locking holes 45 formed in the wheel 40, whereby rotation of the felt 51 with respect to the wheel 40 is regulated. Note that the locking holes 45 formed in the wheel 40 also serves as lightening holes for saving weight of the wheel 40.

Referring to FIG. 1 again, the electric motor 20 is housed in the motor case 4. The electric motor 20 is a driving source of the wheel 40. A driving force outputted from the electric motor 20 is inputted into the wheel 40 via a planetary gear type speed reduction mechanism. Specifically, a gear provided on an output shaft of the speed reduction mechanism engages with the gear 41a (see FIG. 2) provided on the rotational shaft 41 of the wheel 40. The electric motor 20 operates by electric power supplied from a battery 60 mounted on the coupling portion 6 of the housing 2. Namely, the battery 60 is a power source of the electric motor 20. The battery 60 according to the present embodiment is a secondary battery that includes a plurality of battery cells (lithium-ion battery). Of course, the battery cells can be replaced by a nickel-hydrogen battery, a lithium-ion polymer battery, a nickel-cadmium battery, or the like.

A control board 61 is housed inside the coupling portion 6. a controller as a control unit is mounted on the control board 61. The controller is a microcomputer configured by a CPU, a ROM, a RAM, and the like. The controller controls the electric motor 20 with PWM (Pulse Width Modulation). Specifically, the electric motor 20 is a brushless motor. The controller adjusts a ratio of ON time and OFF time of each of a plurality of switching elements provided on a feeding line of the electric motor 20, that is, a duty ratio thereof.

An accumulating container (chamber) 15 that forms an accumulator 14 is provided at an upper portion of the cylinder 10. The accumulator 14 communicates with the piston chamber 12. The piston chamber 12 and the accumulator 14 are filled with compressible fluid (in the present embodiment, compressed air) in advance. When the piston 11 positioned at the bottom dead center is to be moved to a side of the top dead center, the electric motor 20 operates in accordance with a control of the controller. When the electric motor 20 operates, the wheel 40 illustrated in FIG. 3 is rotated. At this time, the wheel 40 is rotated in a counterclockwise direction in FIG. 3.

When the wheel 40 is rotated, the pins 44 respectively engage with the racks 31. Then, with rotation of the wheel 40, the plurality of pins 44 that is positioned downstream in a rotational direction of the wheel 40 compared with the pin 44 that first engaged with the rack 31 in turn engages with a plurality of racks 31a that is positioned at a lower side of a moving direction of the driver blade 30 than a rack 31b that first engaged with the pin 44. The driver blade 30 is gradually lifted up, whereby the piston 11 is moved from the bottom dead center side toward the top dead center side. Namely, the driver blade 30 and the piston 11 are moved upward. Then, when the wheel 40 is rotated until the pin 44 that is positioned at the most downward side in the rotational direction engages with the rack 31 that is positioned at the lowermost side in the moving direction, the driver blade 30 is lifted up to the uppermost position, and the piston 11 reaches the top dead center. Note that the blade tip reaches the upper limit position when the driver blade 30 is lifted up to the uppermost position.

When the pins 44 engage with (or comes into contact with) the racks 31 as described above, lubricant fed to the pin 44 by the lubricant feeding mechanism 50 is fed to the corresponding rack 31 via the pin 44, whereby both the pins 44 and the racks 31 are lubricated. In other words, lubricant applied to a surface of the pin 44 is applied to a surface of the rack 31. Further, each of the pins 44 is rotatably held. Thus, when the wheel 40 is rotated in a state where a given pin 44 engages with the corresponding rack 31, a rotative force acts on the pin 44, whereby the pin 44 is rotated. On the other hand, an outer peripheral surface of the pin 44 is always contact with the felt 51. Namely, the pin 44 rotates on its own axis while being in contact with the felt 51. Therefore, the lubricant is applied to the whole circumference of the pin 44. Even if the lubricant is not applied to the whole circumference of the pin 44 by one round of engagement and release of the engagement with the rack 31, the lubricant is applied to the whole circumference of the pin 44 while plural rounds of the engagement and the release of the engagement with the rack 31 are repeated.

An operation of the fastener driving machine 1 will be described with reference to FIG. 1 again. Air in the piston chamber 12 is sent into the accumulator 14 and compressed in the course of moving (or moving upward) the piston 11 as described above. Then, when the engagement of the pin 44 with the rack 31 is released, the piston 11 is moved from the top dead center side to the bottom dead center side by pressure of the compressed air (air pressure) in the piston chamber 12 and the accumulator 14, whereby the driver blade 30 is lowered.

Here, a pin 44a illustrated in FIG. 3 is different from the other pins 44, and is allowed to move in a direction to approach the center of the wheel 40. This is because engagement of the pin 44a with the rack 31b can be released forcibly by sliding the pin 44a when a defect occurs in the engagement of the pin 44a with the rack 31b. note that the pin 44a and the rack 31b are a pin and a rack that first engage with each other when the driver blade 30 is lifted up.

Referring to FIG. 1 again, a push switch 70 is provided in the nose part 7. The push switch 70 is held so as to be moved in the vertical direction, and is always biased toward a downward direction by a coil spring. When the push switch 70 is pressed to the driven material and is moved upward against the bias of the coil spring, a signal (push switch signal) is outputted from a push switch detecting circuit. Further, a trigger switch is built in the handle 5. When a trigger 5a provided on the handle 5 is operated, the trigger switch is operated. When the trigger switch is operated, a signal (the trigger switch signal) is outputted from a trigger switch detecting circuit.

The push switch detecting circuit and the trigger switch detecting circuit are mounted on the control board 61 on which the controller is mounted. The push switch signal outputted from the push switch detecting circuit and the trigger switch signal outputted from the trigger switch detecting circuit are inputted into the controller. When the two signals are inputted, the controller turns each of switching elements in an inverter circuit ON/OFF via a control signal outputting circuit, whereby a motor current is supplied to the electric motor 20. This causes the wheel 40 to be driven to rotate as described above, whereby the driver blade 30 is lifted up and the piston 11 is moved from the bottom dead center side to the top dead center side. Then, the piston 11 is moved from the top dead center side to the bottom dead center side, and the driver blade 30 is lowered. Namely, the piston 11 reciprocates once between the bottom dead center and the top dead center, and the fastener is hit by the driver blade 30 with this. In other words, a driving motion is carried out once.

The above is a basic operation of the fastener driving machine 1 according to the present embodiment. Namely, when a predetermined condition is satisfied, the electric motor 20 operates under a control of the controller, whereby the wheel 40 is rotated. Then, the plurality of pins 44 provided in the wheel 40 in turn engages with the plurality of racks 31 provided on the driver blade 30, whereby the driver blade 30 is lifted up. At the same time, the piston 11 is moved from the bottom dead center side toward the top dead center side in the cylinder 10. Then, when the piston 11 reaches the top dead center and the engagement of the pin 44 with the rack 31 is released, the piston 11 is moved from the top dead center side toward the bottom dead center side by the air pressure (or a gas spring), whereby the driver blade 30 is lowered to cause a fastener to come out. Hereinafter, the above operation is repeated so long as the predetermined condition is satisfied. However, the above operation is stopped when the predetermined condition is not satisfied.

As described above, the plurality of pins 44 provided in the wheel 40 and the plurality of racks 31 provided on the driver blade 30 repeat the engagement and the release of the engagement during the operation of the fastener driving machine 1. However, the lubricant feeding mechanism 50 that holds the lubricant and feeds the lubricant to the pins 44 and the racks 31 during the operation of the fastener driving machine 1 is provided in the fastener driving machine 1 according to the present embodiment. Therefore, it is possible to suppress abrasion of the pins 44 and the racks 31 over a long period of time. Further, there is no need for a worker to frequently lubricate them in order to reduce the abrasion of the pins 44 and the racks 31.

As described above, according to the present invention, it is possible to improve maintainability and product lifetime of the fastener driving machine by a simple structure.

Note that when the driving motion is to be terminated, the fastener driving machine 1 according to the present embodiment prepares for a next driving motion by moving the blade tip to a standby position that is set between the lower limit position and the upper limit position.

Further, the inverter circuit according to the present embodiment is a three-phase full-bridge inverter circuit. A part of the switching elements therein is a high-side switching element, the other part of the switching elements therein is a low-side switching element.

Further, a rotator position detecting circuit, a motor rotation speed detecting circuit, and the like are mounted on the control board 61. The rotator position detecting circuit is configured to detect a position of a rotator (or a rotor) of the electric motor 20 on the basis of a signal outputted from a Hall element that is a magnetic sensor. The motor rotation speed detecting circuit is configured to detect a rotation speed of the rotator (or the rotor) of the electric motor 20 on the basis of a detection result of the rotator position detecting circuit. Moreover, a circuit voltage applying circuit, a battery remaining amount detecting circuit, and the like are mounted on the control board 61 illustrated in FIG. 1. The circuit voltage applying circuit is configured to supply necessary electric power to the controller. The battery remaining amount detecting circuit is configured to detect a remaining amount of the battery 60 on the basis of the electric power (voltage) supplied (or applied) to the controller via the circuit voltage applying circuit. In addition, a motor current detecting circuit and a stop switch detecting circuit are mounted on the control board 61. The motor current detecting circuit is configured to detect a motor current supplied from the battery 60 to the electric motor 20. The stop switch detecting circuit is configured to output a signal (that is, a motor stop signal) when a motor stop switch is operated.

In the present embodiment, the felt 51 constituting the lubricant feeding mechanism 50 does not come into contact with each of the racks 31, but comes into contact with each of the pins 44. However, by modifying a shape or a size of the felt 51 or the rack 31, it is possible to cause the felt 51 to come into contact with both the pins 44 and the racks 31. In this case, the lubricant is directly fed to each of the racks 31.

Second Embodiment

Hereinafter, another example of a fastener driving machine to which the present invention is applied will be described in detail with reference to the drawings. Of course, a fastener driving machine according to the present embodiment has a basic configuration common to the fastener driving machine 1 according to the first embodiment (see FIG. 1). Here, in each of the drawings referred in the following explanation, the same reference numeral is assigned to the same or substantially the same as the configuration that has already been explained, whereby its explanation is omitted.

A main difference between the fastener driving machine according to the present embodiment and the fastener driving machine 1 according to the first embodiment is as follows. Namely, in the fastener driving machine 1 according to the first embodiment, the felt 51 as the lubricant impregnated body is disposed inside the pins 44 in the radial direction of the wheel 40. On the other hand, in the fastener driving machine according to the present embodiment, a felt 51 is disposed outside pins 44 in a radial direction of a wheel 40.

Figure 4B:
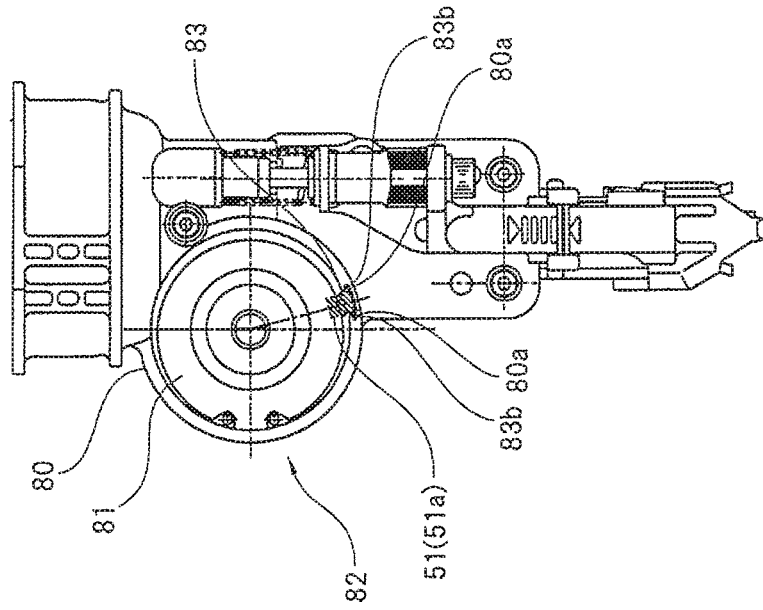
FIGS. 4A and 4B are partially enlarged views of a fastener driving machine according to a second embodiment.
Figure 4A:
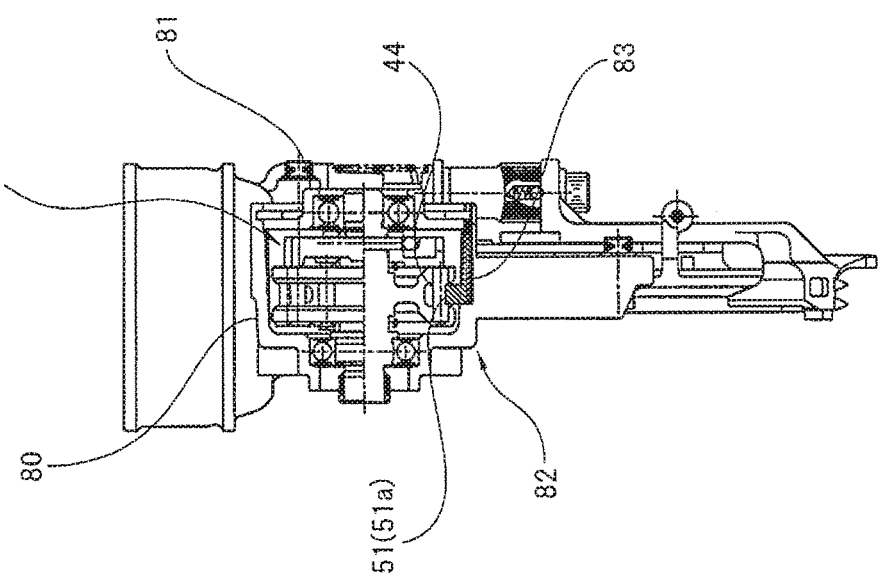

As illustrated in FIGS. 4A and 4B, the wheel 40 is housed in a case 82. The case 82 consists of a roughly cylindrical case body 80 and a disk-shaped cover 81. The disk-shaped cover 81 closes an opening of the case body 80. The case 82 is formed independently from a nose part 7. The case 82 may be connected to the nose part 7, or may be formed integrally with the housing 2. On the other hand, the felt 51 is held by a holder 83 that is attached to the case 82, and is in contact with the pin 44 inside the case 82. The holder 83 may be formed integrally with the case 82. Alternatively, the holder 83 may be formed integrally with the housing 2, thereby having a structure in which the felt 51 is in contact with the pin 44 by assembling the housing 2.

Figure 5A:
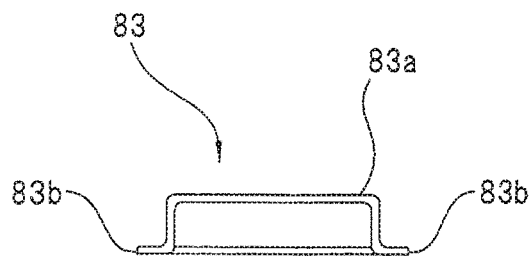
FIGS. 5A, 5B and 5C are respectively a front view of a holder, a plan view of the holder, and a side view of the holder.
Figure 5B:
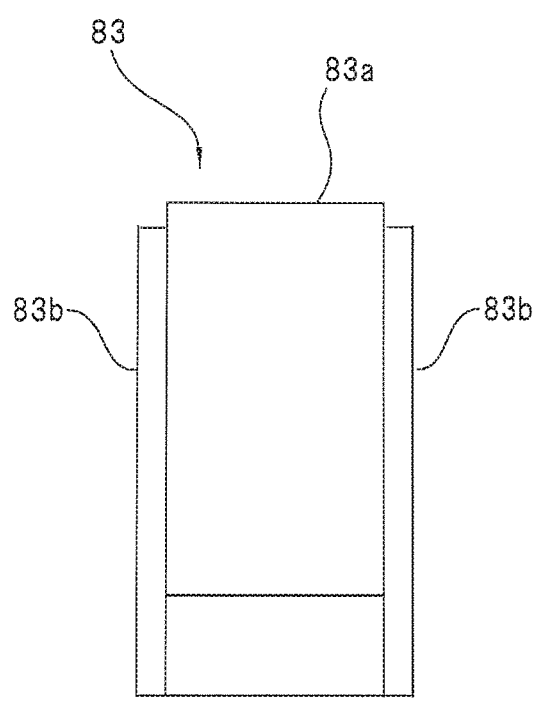
Figure 5C:
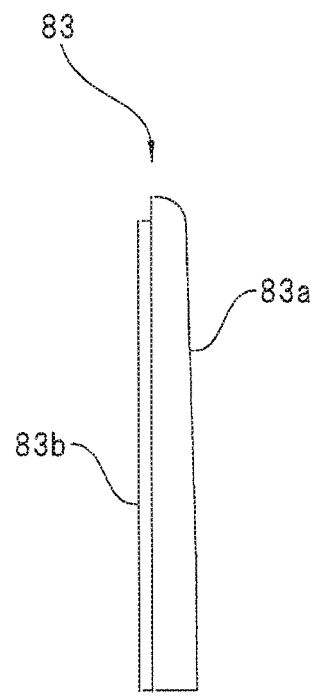
Figure 6A:
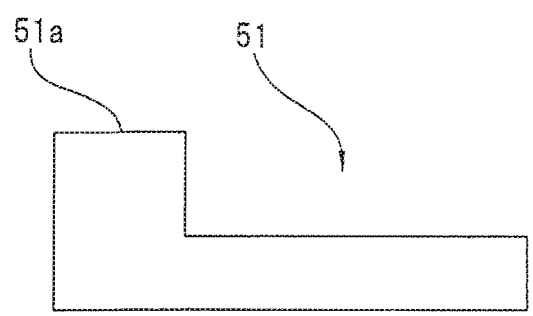
Figure 6B:
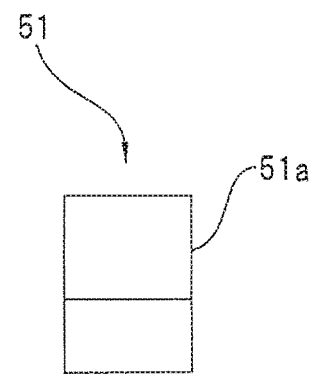

As illustrated in FIGS. 5A, 5B and 5C, the holder 83 is formed into an elongated shape by sheet metal. The holder 83 includes a coating part 83*a* that partially covers the felt 51 illustrated in FIGS. 6A and 6B, and inserting parts 83*b* that are respectively formed at both sides of the coating part 83*a* in a width direction thereof. An overall length of each of the inserting parts 83*b* is the same or substantially the same as an overall length of the felt 51, while an overall length of the coating part 83*a* is shorter than the overall length of each of the felt 51 and the inserting part 83*b*. On the other hand, a protrusion 51*a* is provided at one end (that is, a tip) of the felt 51 in a longitudinal direction thereof. The protrusion 51*a* is higher than the remaining portion of the felt 51, whereby the felt 51 has a roughly L-shaped side as a whole.

Referring to FIGS. 4A and 4B, when the felt 51 is mounted on the fastener driving machine, the felt 51 is mounted on an inner circumferential surface of the case body 80, and the holder 83 is placed on the mounted felt 51. Specifically, a place where the felt 51 is to be mounted is set in advance on the inner circumferential surface of the case body 80. Slits 80*a* are formed at both sides of this mounting place. The inserting parts 83*b* of the holder 83 are respectively to be inserted into the slits 80*a*. When the felt 51 is mounted at the predetermined mounting place and the inserting parts 83*b* of the holder 83 are then inserted into the slits 80*a*, the greater part of the felt 51 except for the tip thereof (that is, the protrusion 51*a*) is covered by the coating part 83*a* (see FIGS. 5A, 5B and 5C ) of the holder 83, while the tip of the felt 51 (the protrusion 51*a*) protrudes upward with respect to the coating part 83*a*, and comes into contact with the pin 44. At the same time, the felt 51 is somewhat crushed, and lubricant impregnated in the felt 51 seeps on a surface of the felt 51.

As described above, on the basis of a principle similar to the principle in the fastener driving machine 1 according to the first embodiment, the lubricant is fed to the pins 44 and racks, whereby they are lubricated.

As illustrated in FIGS. 7A and 7B, by changing a shape or a size of the felt 51 and forming an opening on the case 82, a rear end 51*b* of the felt 51 can be exposed to the outside of the case 82. In this embodiment, the one end (that is, a tip side) of the felt 51 in the longitudinal direction thereof is disposed at a position at which the felt 51 is allowed to come into contact with the pin 44, and the other end (that is, a rear end side) of the felt 51 in the longitudinal direction thereof is exposed to the outside of the case 82 in which the wheel 40 is housed. Therefore, it is possible to replenish the felt 51 with the lubricant without opening the ease 82.

The present invention is not limited to the embodiments described above, and various modifications can be made without departing from the scope of the present invention. For example, the lubricant impregnated body is not limited to the felt 51, and may be any material that can hold the lubricant and whose hardness is adequately lower than that of the pin 44 (that is, soft). For example, the lubricant impregnated body may be porous resin such as a sponge, elastomer, woven fabric or non-woven fabric made of polymeric material or fibrous material, or the like.

EXPLANATION OF REFERENCE NUMERALS

1 . . . fastener driving machine, 2 . . . housing, 3 . . . cylinder case, 4 . . . motor case, 5 . . . handle, 5*a* . . . trigger, 6 . . . coupling portion, 7 . . . nose part, 8 . . . magazine, 10 . . . cylinder, 11 . . . piston, 12 . . . piston chamber, 13 . . . damper, 14 . . . accumulator, 20 . . . electric motor, 30 . . . driver blade, 31, 31*a* . . . rack, 40 . . . wheel, 41 . . . rotational shaft, 41*a* . . . gear, 42 . . . first flange part, 43 . . . second flange part, 44, 44*a* . . . pin, 45 . . . locking hole, 50 . . . lubricant feeding mechanism, 51 . . . felt, 51*a* . . . protrusion, 51*b* . . . rear end, 52 . . . projected portion, 60 . . . battery, 61 . . . control board, 70 . . . push switch, 80 . . . case body, 80*a* . . . slit, 81 . . . cover, 82 . . . case, 83 . . . holder, 83*a* . . . coating part, 83*b* . . . inserting part

The invention claimed is:

1. A fastener driving machine configured to drive a fastener into a driven material, the fastener driving machine comprising:
    a hitting member configured to reciprocate in a first direction and a second direction opposite the first direction, the hitting member being configured to hit a fastener when the hitting member moves in the first direction;
    a wheel driven to rotate;
    engaging members being provided along a circumferential direction of the wheel, the engaging members engaging with the hitting member to move the hitting member in the second direction; and
    a lubricant feeding mechanism configured to feed lubricant to the engaging members,
    wherein the lubricant feeding mechanism includes a lubricant impregnated body in which the lubricant is impregnated,
    wherein the lubricant impregnated body is disposed at a position at which the lubricant impregnated body is at least allowed to come into contact with the engaging members, and
    wherein the lubricant feeding mechanism is provided in the wheel.

2. The fastener driving machine according to claim 1, wherein the lubricant impregnated body is disposed inside the engaging members in a radial direction of the wheel.

3. The fastener driving machine according to claim 2, wherein the lubricant impregnated body is rotated together with the wheel.

4. The fastener driving machine according to claim 2, wherein the lubricant impregnated body has a projected portion that is configured to engage with the wheel.

5. The fastener driving machine according to claim 1, wherein a plurality of racks configured to engage with the engaging members is provided on the hitting member, and the lubricant impregnated body is configured to come into contact with both the engaging members and the racks.

6. The fastener driving machine according to claim 3, wherein the lubricant impregnated body has a projected portion that is configured to engage with the wheel.

7. A fastener driving machine configured to drive a fastener into a driven material, the fastener driving machine comprising:
    a hitting member configured to reciprocate in a first direction and a second direction opposite the first direction, the hitting member being configured to hit a fastener when the hitting member moves in the first direction;
    a wheel driven to rotate;
    engaging members being provided along a circumferential direction of the wheel, the engaging members engaging with the hitting member to move the hitting member in the second direction; and
    a lubricant feeding mechanism configured to feed lubricant to the engaging members,
    wherein the lubricant feeding mechanism includes a lubricant impregnated body in which the lubricant is impregnated,
    wherein the lubricant impregnated body is disposed at a position at which the lubricant impregnated body is at least allowed to come into contact with the engaging members, and
    wherein the lubricant impregnated body is disposed outside the engaging members in a radial direction of the wheel.

8. The fastener driving machine according to claim 7, wherein at least a part of the lubricant impregnated body is provided in a case that covers the wheel.

9. The fastener driving machine according to claim 8, wherein one end of the lubricant impregnated body in a longitudinal direction thereof is disposed at a position at which the lubricant impregnated body is allowed to come into contact with the engaging members, and another end of the lubricant impregnated body in the longitudinal direction thereof is exposed to an outside of the case in which the wheel is housed.

10. A fastener driving machine configured to drive a fastener into a driven material, the fastener driving machine comprising:
    a hitting member configured to reciprocate in a first direction and a second direction opposite the first direction, the hitting member being configured to hit a fastener when the hitting member moves in the first direction;
    a wheel driven to rotate;
    engaging members being provided along a circumferential direction of the wheel, the engaging members engaging with the hitting member to move the hitting member in the second direction; and
    a lubricant feeding mechanism configured to feed lubricant to the engaging members,
    wherein the lubricant feeding mechanism is provided in the wheel.

* * * * *